United States Patent
Bell et al.

(10) Patent No.: US 8,532,644 B2
(45) Date of Patent: Sep. 10, 2013

(54) SYSTEM EFFECTIVE TO MODULATE A CODE AND PROVIDE CONTENT TO A USER

(76) Inventors: Alex Bell, New York, NY (US); Jonathan Glanz, New York, NY (US)

(*) Notice: Subject to any disclaimer, the term of this patent is extended or adjusted under 35 U.S.C. 154(b) by 0 days.

(21) Appl. No.: 13/286,613

(22) Filed: Nov. 1, 2011

(65) Prior Publication Data

US 2013/0078988 A1 Mar. 28, 2013

Related U.S. Application Data

(60) Provisional application No. 61/538,370, filed on Sep. 23, 2011, provisional application No. 61/538,395, filed on Sep. 23, 2011, provisional application No. 61/538,443, filed on Sep. 23, 2011.

(51) Int. Cl.
*H04W 88/00* (2009.01)

(52) U.S. Cl.
USPC .......................................... 455/420; 705/14.25

(58) Field of Classification Search
USPC ............... 455/419–420, 422.1, 456.1–457, 455/500, 550.1, 556.1–557
See application file for complete search history.

(56) References Cited

U.S. PATENT DOCUMENTS

| | | | | |
|---|---|---|---|---|
| 4,464,766 | A * | 8/1984 | Masur | 375/276 |
| 2004/0127210 | A1* | 7/2004 | Shostak | 455/422.1 |
| 2005/0010697 | A1* | 1/2005 | Kinawi et al. | 710/1 |
| 2006/0235864 | A1* | 10/2006 | Hotelling et al. | 707/101 |
| 2007/0015515 | A1* | 1/2007 | Matsuda | 455/456.1 |
| 2010/0287585 | A1* | 11/2010 | Frondal et al. | 725/31 |
| 2012/0061462 | A1* | 3/2012 | Shadwell et al. | 235/375 |
| 2012/0130790 | A1* | 5/2012 | Lyons et al. | 705/14.25 |

* cited by examiner

*Primary Examiner* — Kashif Siddiqui

(74) *Attorney, Agent, or Firm* — Moritt Hock & Hamroff LLP; Steven S. Rubin, Esq.

(57) ABSTRACT

A system and method effective to provide content to a user. The system may include a sound device, a smart phone, and a processor. The sound device may modulate a code where a first set of frequencies represents a logic 0 and a second set of frequencies represents a logic 1. The smart phone may demodulate the modulated code to reproduce the code. The smart phone may send the code as a query to a processor. The processor may receive the query, determine content associated with the code, and send the content over the network to the smart phone. The smart phone may further receive the content and display the content on a display.

17 Claims, 2 Drawing Sheets

SYSTEM EFFECTIVE TO MODULATE A CODE AND PROVIDE CONTENT TO A USER

CROSS-REFERENCE TO RELATED APPLICATIONS

The present application claims priority to provisional application No. 61/538,370 entitled "SYSTEM EFFECTIVE TO ENCODE A SIGNAL AND PROVIDE CONTENT TO A USER" filed Sep. 23, 2011 naming Alex Bell and Jonathan Glanz as inventors, which is and claims priority to provisional application No. 61/538,395 entitled "SYSTEM EFFECTIVE TO DECODE A SIGNAL AND PROVIDE CONTENT TO A USER" filed Sep. 23, 2011 naming Alex Bell and Jonathan Glanz as inventors, which is and to provisional application No. 61/538,443 entitled "DEVICE EFFECTIVE TO ENCODE A SIGNAL AND TO PROVIDE CONTENT TO A USER" filed Sep. 23, 2011 naming Alex Bell and Jonathan Glanz as inventors, which is co-pending; the entirety of these three applications is hereby incorporated by reference in their entirety.

BACKGROUND OF THE INVENTION

1. Field of the Invention

This disclosure relates to a system and method effective to modulate a code and provide targeted content to a user of a smart phone in sound communication with a sound device.

2. Description of the Related Art

A smart phone may include devices and structures capable of communicating over a cellular or satellite network. Smart phones may also be capable of storing an application capable of utilizing some of the data available to the smart phone. For example, the application may be able to combine a user's contact list and location to generate additional content for the user.

SUMMARY OF THE INVENTION

One embodiment of the invention is a system effective to provide content to a user. The system may comprise a sound device effective to modulate a code by assignment of a first set of frequencies for a logic 0 and a second set of frequencies for a logic 1 to produce a modulated code and output the modulated code. The system may further comprise a smart phone in communication with the sound device. The smart phone may be effective to receive the modulated code, demodulate the modulated code to reproduce the code and send the code over a network as a query to a processor. The processor may be effective to receive the query including the code, determine content associated with the code, and send the content to the smart phone. The smart phone may further be effective to receive the content and output the content.

Another embodiment of the invention is a method for providing content to a user. The method may comprise modulating, by a sound device, a code using first set of frequencies for a logic 0 and second set of frequencies for a logic 1, to produce a modulated code. The method may further comprise outputting the modulated code by the sound device. The method may further comprise receiving a query including the code, at a processor, from a smart phone. The method may further comprise determining content associated with the code at the processor. The method may further comprise sending the content to the smart phone.

Yet another embodiment of the invention is a smart phone effective to provide content to a user. The smart phone may comprise a microphone, a memory, and a first processor in communication with the microphone and the memory. The microphone is effective to receive a modulated code, the modulated code including a code modulated using first set of frequencies for a logic 0 and second set of frequencies for a logic 1. The first processor may be effective to demodulate the modulated code to reproduce the code based on instructions in the memory. The first processor may be effective to send the code over a network as query to a second processor. The first processor may be effective to receive content from the second processor in response to the query. The first processor may be effective to output the content.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

Figure 1:
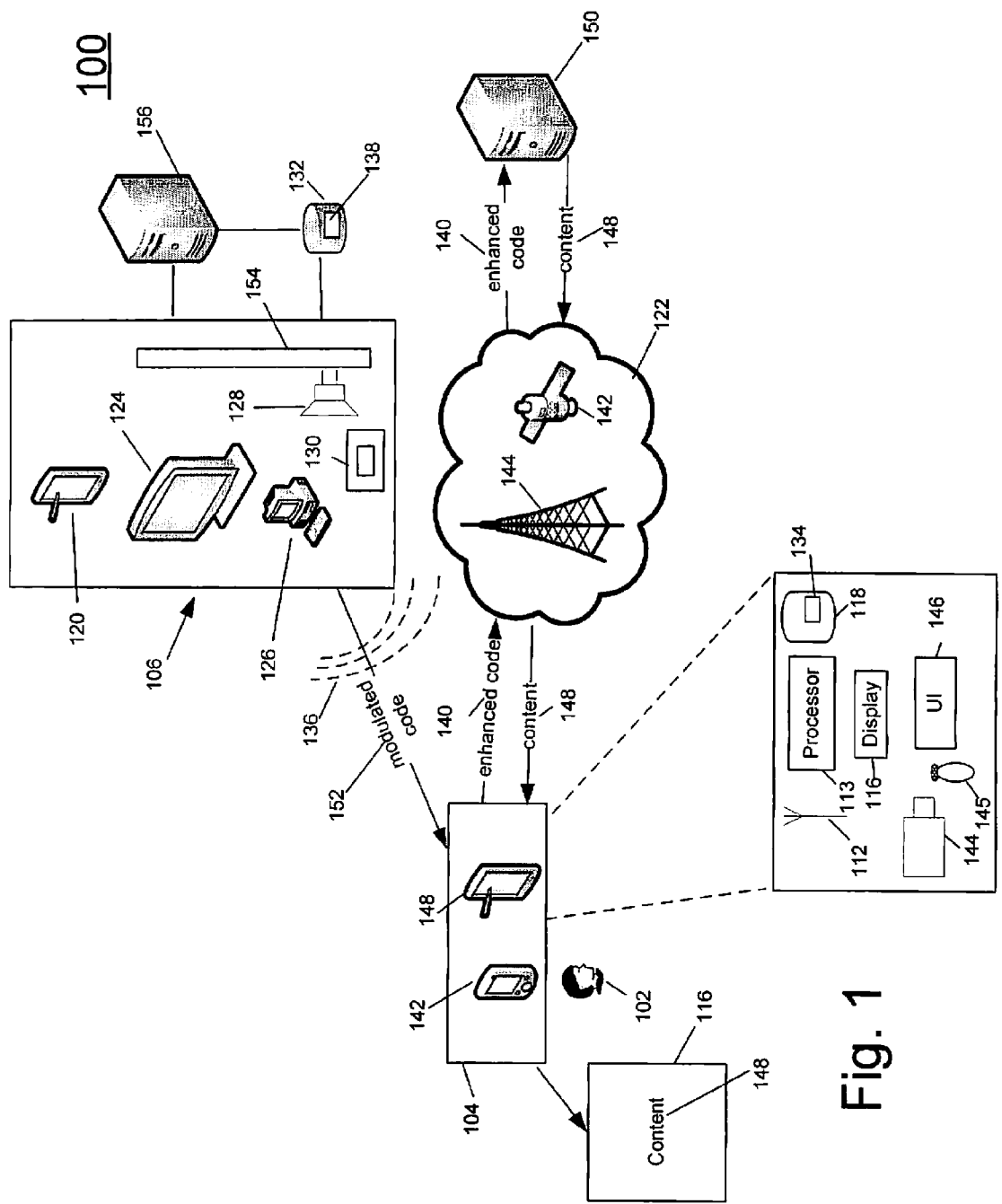
FIG. 1 is a system drawing of a system effective to modulate a code and provide content to a user in accordance with an embodiment of the invention.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Referring to FIG. 1, there is shown a system 100 in accordance with an embodiment of the invention. In summary, a smart phone 104 may be configured to receive audio waves 136 output by a sound device 106. Waves 136 may be frequency modulated to modulate a binary code 138. Smart phone 104 may demodulate code 138 from modulated code 152 sent in waves 136 to reproduce code 138. Smart phone 104 may send an enhanced code 140 across a network 116 as a query to a processor 150. In response to a query including enhanced code 140, processor 150 may send content 148 to smart phone 104 to be output by smart phone 104. User 102 may be informed of receipt of content 148 such as through a vibration of smart phone 104. Content 148 may be anything that can be outputted by a smart phone such as a coupon, audio, video, audio-video, digital piece of content, movie, web page, a pointer to content, etc.

Smart phone 104 may include an antenna 112, a display 116, a memory 118, a user interface 146, a microphone 145, and a camera 144 all in communication with a processor 113. Antenna 112 may enable wireless communications with a cellular base station 144 or satellite 142 in network 122.

Memory 118 may store an application 134 effective to provide instructions for processor 113.

Sound device 106 may be any device capable of outputting sound waves. For example, sound device 106 may be a smart phone 120, a television 124, a computer 126, a badge 130 such as a participant may wear in a conference, a speaker 128 such as a beacon, etc. In examples where sound device 106 is a beacon 128, beacon 128 could be placed on, for example, a shelf 154 in a store. Speaker 128 could also be a speaker effective to output sound waves audible by a human such as in a public address system. Sound device 106 may include and/or be in communication with a processor 156 and a memory 132 that may include code 138. Sound device 106 may be configured to adjust a volume magnitude of sound waves 136 based on desired distance between sound device 106 and a potential user 102 using smart phone 104. Based on a volume magnitude of sound waves 136 a range may be defined including locations where smart phone 104 has difficulty demodulating modulated code 152, and locations where smart phone 104 can demodulate modulated code 152.

The inventors have discovered that, as many different types of devices may be used for sound device 106, many different ranges of frequencies may be used to modulate code 138 on to sound waves 126 making demodulation of modulated code 152 complex. Further, an environment around sound device 106 may be noisy. Code 138 may be a binary code comprised of logic 0s and logic 1 s. Sound device 106 may be configured, such as through processor 156, to modulate and output modulated code 152 by assignment of a first range of frequencies for a logic "0" and assignment of a second range of frequencies for a logic "1". This allows modulated code 152 to be output from a plurality of distinct sound devices 106 which may have different speaker resolution outputs.

For example, a logic "0" may be assigned to sound pulses in wave 136 with a frequency in the range between about 20,550 Hz and about 21,000 Hz. Similarly, a logic "1" may be assigned to sound pulses with a frequency in the range from about 21,000 Hz to about 22,000 Hz. Each sound pulse may be, for example, about 1 ms in duration. Sound device 106 may thus be able to generate modulated code 152, including a series of logic 0s and 1s, by outputting sound pulses in a first range of frequencies, and a second range of frequencies, respectively. The entire modulated code 152 may last about 32 ms long and may include 32 logic bits. Modulated code 152 may be repeatedly and periodically output by sound device 106. In an example, a clock pulse may be output in between each sound pulse. For example, the clock pulse may be in a third set of frequencies, such as that centered in between the first and second ranges of frequencies. In the example, the clock pulse may be at 21,000 Hz. The clock pulse may be used to denote the beginning of a new bit.

Sound waves 136 may be received by microphone 145 smart phone 104 and processed by processor 113 using instructions in application 134. Processor 113 may demodulate modulated code 152 to reproduce code 138. Processor 113 may then add additional context data to code 138 relating to smart phone 104 to produce enhanced code 140. For example, processor 113 may add information relating to an owner of application stored on smart phone 104 such as an indication of a particular brand, mark, or company. For example, application 134 may be owned by company X and may be used to promote sale of products relating to product X. Enhanced code 140 may include information regarding a location of smart phone 104 and/or a location of sound device 106. Enhanced code 140 may include an identifier of smart phone 104 so that, upon receipt of enhanced code 140, processor 150 may not repeatedly send content 148 to smart phone 104.

As mentioned above, enhanced code 140 may be sent over network 116 as a query to processor 150. In response to enhanced code 140, processor 150 may send content 148 over network 116 to smart phone 104 for output on display 116.

In an example, beacon 128 may sit on shelf 154 and output waves 136 including code 138 relating to brand X. Smart phone 104 may receive waves 136, demodulate code 138 and generate enhanced code 140. Processor 150 may receive enhanced 140 and send content 148 to smart phone 104 relating to brand X. For example, content 148 may include a coupon relating to brand X.

Among other benefits, an advertiser using a system in accordance with this disclosure may be able to inexpensively reach a user's smart phone when the user is in sound communication with a real world place or when the user is experiencing media. Expensive hardware need not be used as in other devices that require processors and feedback loops to ensure that a particular frequency is emitted—as in situations where the particular value of the frequency is used as a query. A potential user's smart phone may be targeted at a particular location such as in an aisle in a store. In another example, a conference participant may wear an inexpensive, disposable badge with a beacon effective to output a sound wave with a modulated code. The code may result in content 148 indicating that a person (with the badge) is in close proximity of the smart phone and may further provide information about the person wearing the badge. A television commercial can output a code inaudible to humans in conjunction with an audible commercial.

Figure 2:
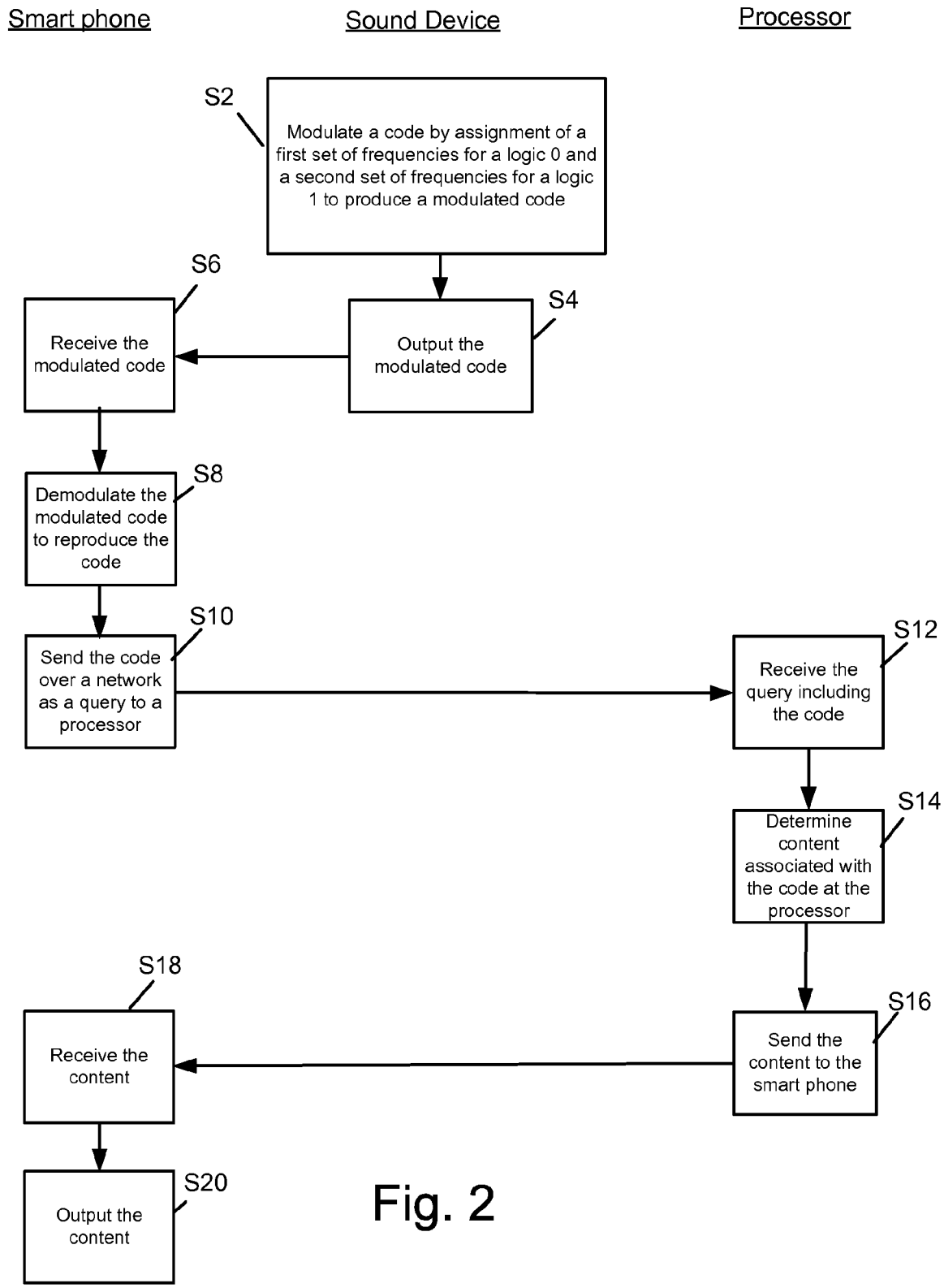
FIG. 2 is a flow chart illustrating a process that may be performed in accordance with an embodiment of the invention.

Referring to FIG. 2, there is shown a process which may be performed in accordance with an embodiment of the invention. The process could be implemented using, for example, system 100 discussed above with respect to FIG. 1.

As shown, at a step S2, a sound device may be effective to modulate a code using first set of frequencies for a logic 0 and a second set of frequencies for a logic 1 to produce a modulated code. At step S4, the sound device may output the modulated code.

At step S6, a smart phone may receive the modulated code. At step S8, the smart phone may demodulate the modulated code to reproduce the code. At step S10, the smart phone may send the code over a network as a query to a processor.

At step S12, the processor may receive the query including the code from the smart phone. At step S14, the processor may determine content associated with the code. At step S16, the processor may send the content to the smart phone.

At step S18, the smart phone may receive the content. At step S20, the smart phone may output the content.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system effective to provide content to a user, the system comprising:
   a sound device effective to
      modulate a code by assignment of a first set of frequencies for a logic 0 and a second set of frequencies for a logic 1 to produce a modulated code, and
      output the modulated code;
   a smart phone in communication with the sound device, the smart phone effective to receive the modulated code,
demodulate the modulated code to reproduce the code;
send the code over a network as a query to a processor;
the processor effective to
receive the query including the code,
determine content associated with the code, and
send the content to the smart phone; and
the smart phone further effective to receive the content and output the content;
wherein the sound device is effective to output the modulated code through sound pulses where each sound pulse is of a time duration and of the first set of the frequencies or the second set of frequencies, wherein the sound device is effective to output a clock pulse in a third set of frequencies prior to the sound pulses.

2. The system as recited in claim 1, wherein the smart phone is effective to display the content on a display.

3. The system as recited in claim 1, wherein the sound device includes a television.

4. The system as recited in claim 1, wherein the sound device is on a badge.

5. The system as recited in claim 1, wherein the sound device includes a speaker effective to output sound audible by a human and to output the modulated code.

6. The system as recited in claim 1, wherein:
the smart phone is effective to send an enhanced code over the network to the processor; and
the enhanced code includes information relating to a location of the smart phone.

7. The system as recited in claim 1, wherein:
the smart phone is effective to send an enhanced code over the network to the processor; and
the enhanced code includes information relating to a location of the sound device.

8. The system as recited in claim 1, further comprising an application stored in a memory of the smart phone; and wherein
the smart phone is effective to send an enhanced code over the network to the processor, and
the enhanced code includes information relating to an owner of the application.

9. The system as recited in claim 1, wherein:
the smart phone is effective to send an enhanced code over the network to the processor; and
the enhanced code includes an identification of the smart phone.

10. The system as recited in claim 1, wherein:
the sound device is effective to output the modulated code through sound pulses where each sound pulse is of a time duration and of the first set of the frequencies or the second set of frequencies;
the smart phone is effective to display the content on a display;
the smart phone is effective to send an enhanced code over the network to the processor;
the enhanced code includes information relating to an owner of the application; and
the enhanced code includes an identification of the smart phone.

11. A method for providing content to a user, the method comprising:
modulating, by a sound device, a code using first set of frequencies for a logic 0 and second set of frequencies for a logic 1, to produce a modulated code;
outputting the modulated code by the sound device;
receiving a query including the code, at a processor, from a smart phone;
determining content associated with the code at the processor; and
sending the content to the smart phone;
outputting, by the sound device, the modulated code through sound pulses, where each sound pulse is of a time duration and of the first set of the frequencies or the second set of frequencies, wherein the sound device is effective to output a clock pulse in a third set of frequencies prior to the sound pulses.

12. The method as recited in claim 11, further comprising receiving, by the processor, an enhanced code including information relating to a location of the smart phone.

13. The method as recited in claim 11, further comprising receiving, by the processor, an enhanced code including information relating a location of the sound device.

14. The method as recited in claim 11, further comprising receiving, by the processor, an enhanced code including information relating to an owner of application stored on the smart phone.

15. The method as recited in claim 11, further comprising receiving, by the processor, an enhanced code including information relating to an identification of the smart phone.

16. A smart phone effective to provide content to a user, the smart phone comprising:
a microphone;
a memory; and
a first processor in communication with the microphone and the memory;
wherein:
the microphone is effective to receive a modulated code, the modulated code including a code modulated using first set of frequencies for a logic 0 and second set of frequencies for a logic 1;
the first processor is effective to demodulate the modulated code to reproduce the code based on instructions in the memory;
send the code over a network as query to a second processor;
receive content from the second processor in response to the query; and
output the content;
wherein the modulated code is received through sound pulses where each sound pulse is of a time duration and of the first set of the frequencies or the second set of frequencies, wherein a clock pulse is received in a third set of frequencies prior to the sound pulses.

17. The smart phone as recited in claim 16, wherein the processor is further effective to:
send an enhanced code over the network to the processor; wherein
the enhanced code includes information relating to an owner of the instructions; and
the enhanced code includes an identification of the smart phone.

* * * * *